(12) United States Patent
Isgar

(10) Patent No.: US 12,019,696 B2
(45) Date of Patent: *Jun. 25, 2024

(54) SYSTEM FOR OBTAINING WEBSITES HAVING A GEOLOCATION NEAR A LOCATION OF A USER COMPUTING DEVICE

(71) Applicant: Charles Isgar, Scottsdale, AZ (US)

(72) Inventor: Charles Isgar, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/864,571

(22) Filed: Jul. 14, 2022

(65) Prior Publication Data
US 2022/0350853 A1 Nov. 3, 2022

Related U.S. Application Data

(63) Continuation-in-part of application No. 16/738,295, filed on Jan. 9, 2020, now Pat. No. 11,488,208.
(Continued)

(51) Int. Cl.
*G06Q 30/02* (2023.01)
*G06F 16/9537* (2019.01)
(Continued)

(52) U.S. Cl.
CPC ........ *G06F 16/9537* (2019.01); *G06F 16/955* (2019.01); *H04L 67/52* (2022.05)

(58) Field of Classification Search
CPC .......... G06Q 30/0261; G06Q 30/0266; G06Q 30/0207–30/0277; G06F 16/9558;
(Continued)

(56) References Cited

U.S. PATENT DOCUMENTS

| | | | |
|---|---|---|---|
| 9,679,325 B2 * | 6/2017 | Nallu | G06F 16/24575 |
| 2008/0147730 A1 * | 6/2008 | Lee | H04N 5/77 348/222.1 |

(Continued)

OTHER PUBLICATIONS

Isgar, Charles, System for Interaction Regarding Real Estate Sales, Social and Business, Patent Cooperation Treaty Application Serial No. PCT/US21/12904, Filed Jan. 11, 2021, International Search Report and Written Opinion dated Feb. 17, 2021.
(Continued)

*Primary Examiner* — Thuy N Nguyen
(74) *Attorney, Agent, or Firm* — Schmeiser, Olsen & Watts LLP

(57) ABSTRACT

Described is a system for obtaining Universal Resource Locators ("URLs") of specific locations, events, public services, businesses and other locations that maintain a URL (website) having a geolocation associated with the URL, wherein the system may utilize computing devices for implementing the system. The system automatically processes the location information of a user computing device and determine what websites have a geolocation near the location of the user computing device. The system may automatically deliver the website to websites to the user computing device as a selectable element, that when selected opens a web browser on the user computing device directly to the website selected.

7 Claims, 19 Drawing Sheets

Related U.S. Application Data

(60) Provisional application No. 62/790,248, filed on Jan. 9, 2019.

(51) Int. Cl.
  *G06F 16/955* (2019.01)
  *H04L 67/52* (2022.01)

(58) Field of Classification Search
  CPC .. G06F 16/9566; G06F 3/0482; G06F 3/0481; G06F 16/9537; G06F 16/955; G06T 11/00; H04L 67/02; H04L 67/18; H04L 67/52
  See application file for complete search history.

(56) References Cited

U.S. PATENT DOCUMENTS

| | | | |
|---|---|---|---|
| 2010/0008265 A1* | 1/2010 | Freer | H04N 1/00307 455/414.1 |
| 2010/0318451 A1 | 12/2010 | Niccolini et al. | |
| 2012/0208551 A1 | 8/2012 | Hill | |
| 2012/0240077 A1* | 9/2012 | Vaittinen | G06F 3/04815 715/781 |
| 2013/0027227 A1 | 1/2013 | Nordstrom | |
| 2013/0073389 A1* | 3/2013 | Heath | G06Q 30/02 705/14.54 |
| 2013/0346240 A1* | 12/2013 | Roberts | H04W 4/024 455/456.3 |
| 2014/0100994 A1* | 4/2014 | Tatzel | G06Q 30/0276 705/27.1 |
| 2014/0168056 A1* | 6/2014 | Swaminathan | G06V 30/142 345/156 |
| 2014/0171039 A1* | 6/2014 | Bjontegard | H04L 67/535 455/414.1 |
| 2014/0228056 A1* | 8/2014 | Busch | G06Q 30/0261 455/456.3 |
| 2014/0279018 A1* | 9/2014 | Hardin | H04W 4/02 705/14.58 |
| 2015/0199436 A1 | 7/2015 | Bailey et al. | |
| 2016/0098755 A1 | 4/2016 | Silvestro et al. | |
| 2017/0032421 A1* | 2/2017 | Semple | G06Q 30/02 |
| 2018/0144524 A1* | 5/2018 | Lotto | G06T 11/60 |
| 2018/0196819 A1 | 7/2018 | Zhang et al. | |
| 2018/0261186 A1* | 9/2018 | Watson | G06F 9/541 |
| 2018/0352041 A1* | 12/2018 | Tasdemiroglu | H04W 4/21 |
| 2019/0179405 A1* | 6/2019 | Sun | G06F 1/1686 |
| 2019/0251719 A1* | 8/2019 | Wang | H04W 4/026 |
| 2020/0302480 A1* | 9/2020 | Busch | G06Q 30/0256 |
| 2020/0387887 A1* | 12/2020 | Rathod | G06Q 20/3224 |

OTHER PUBLICATIONS

Isgar, Charles, System for Interaction Regarding Real Estate Sales, Social and Business, Patent Cooperation Treaty Application Serial No. PCT/US21/12904, Filed Jan. 11, 2021, International Search Report and Written Opinion dated Mar. 3, 2021.

Chengbi et al., "Enriching the GIScience Research Agenda: Fusing Augmented Reality and Location-Based Social Networks," Transactions in GIS 22.3 (2018): 775-788, 2018.

* cited by examiner

SYSTEM FOR OBTAINING WEBSITES HAVING A GEOLOCATION NEAR A LOCATION OF A USER COMPUTING DEVICE

CROSS REFERENCE TO RELATED APPLICATION

This application in a continuation-in-part of U.S. patent application Ser. No. 16/738,295, filed Jan. 9, 2020, which claims priority to U.S. Provisional Patent Application Ser. No. 62/790,248, filed Jan. 9, 2019, the disclosures of which are hereby incorporated entirely herein by reference.

BACKGROUND OF THE INVENTION

Technical Field

This invention generally relates to a point and reference URL searching system, and specifically to a system for obtaining URLs or websites of specific locations, events, public services, businesses and other locations that maintain a URL based on a specified geolocation, wherein the system may utilize computing devices for implementing the system.

State of the Art

Individuals typically travel to or for work, for recreation, for vacation, for shopping and for any number of reasons. This travel may be by vehicle as a driver or passenger, by walking, by bicycles and the like. Often there are certain businesses and locations that the individual patrons or passes and may wish to obtain more information regarding that entity. Currently, this is generally done by the individual locating the name of the business and entering it into the search engine of choice on the user's phone to hopefully obtain the correct URL associated with the business of interest, while trying to sift through the various filters of paid or algorithmically derived search results. There is a lack of systems that allow for direct access to a Universal Resource Locator ("URL") or web address of a business or other location area.

Accordingly, what is needed is a system for a user to obtain URLs having a geolocation corresponding to a location of a user computing device of the user.

SUMMARY OF THE INVENTION

An embodiment includes a system for obtaining URLs with a geolocation, the system comprising: a server having a memory storing geo-identified URL data; and at least one user computing device coupled to the server, wherein the server is programmed to: receive a signal from the user computing device that the user computing device has accessed the system, the signal including the location of the user computing device; automatically process the location information and determine what websites have a geolocation near the location of the user computing device; and automatically send for display on the user computing device, at least one selectable element linked to at least one website having a geolocation near the location of the user computing device; and wherein the user computing device is programmed to: receive and display on the user computing device, the at least one selectable element linked to the at least one website having a geolocation near the location of the user computing device; and activate a web browser on the user computing device in response to selecting the at least one selectable element and direct the web browser to the linked at least one website.

The foregoing and other features and advantages of the invention will be apparent to those of ordinary skill in the art from the following more particular description of the invention and the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

As discussed above, embodiments of the present invention relate to a system for obtaining URLs of businesses or other entity based on geo-identification area. The user can adjust the system for preferred search distance and area. In embodiments, a user includes a static individual at a particular location, such as a business. The user may also include a driver, a passenger or the like in any type of vehicle, and further may include an individual walking, riding a bike, riding a scooter, or any other form of moving from one location to another location.

Figure 1:
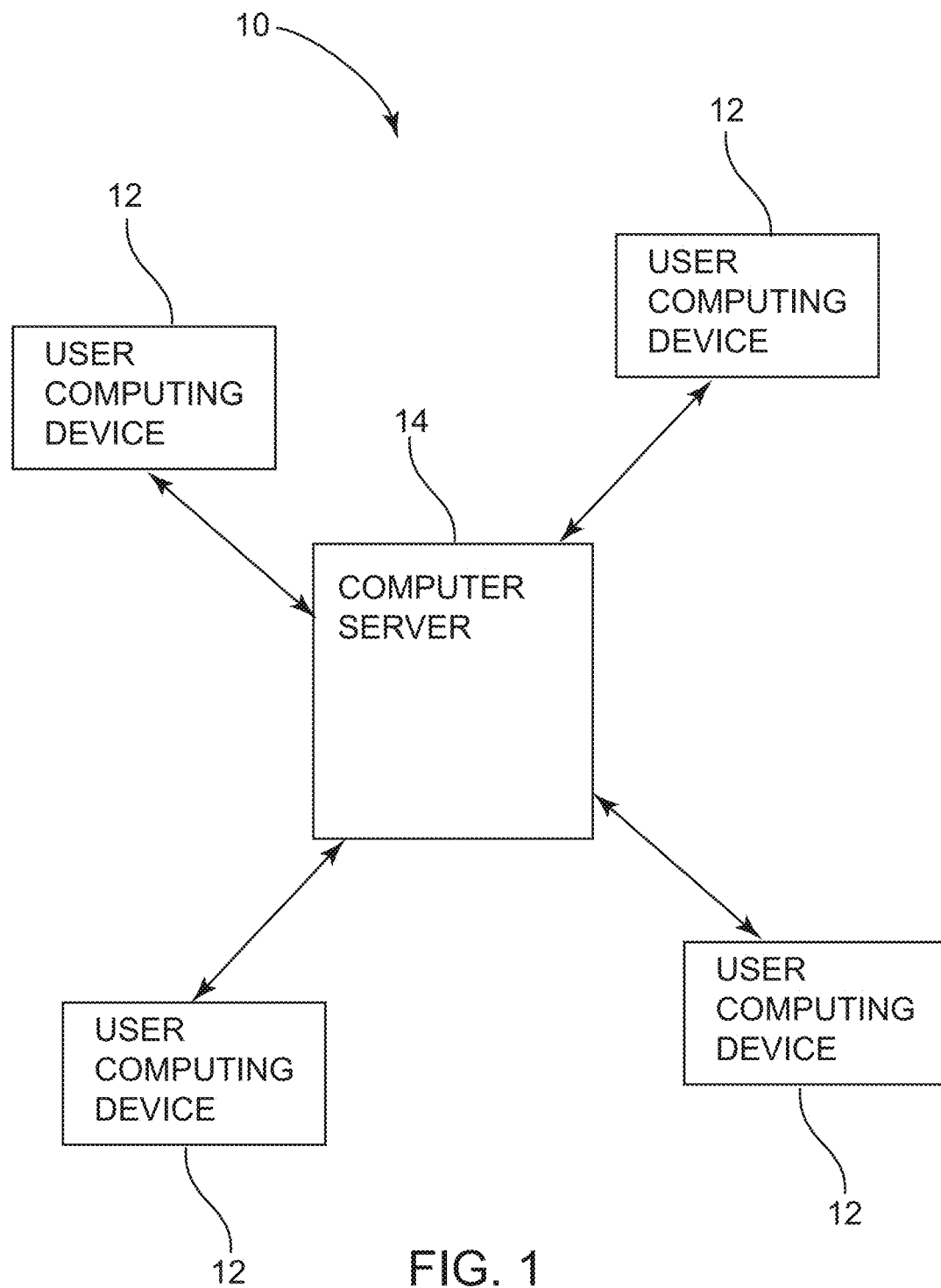
FIG. 1 a diagrammatic view of a system for obtaining URLs based on geo-identification area according to an embodiment.

FIG. 1 depicts an embodiment of a system 10 for obtaining URLs of businesses based on geo-identification area. The system 10 may include user computing devices 12 and a server 14, wherein each user computing device 12 is coupled to the computer server 14. This coupling may be a network connection, such as a wireless connection through an Internet connection, a Wi-Fi connection, a Bluetooth connection or the like, wherein the user computing devices 12 may communicate with and receive communication from the server 14. The user computing device 12 may include a desktop computer, a laptop, a tablet, a smartphone, a vehicle-installed computing device and the like. The server 14, in some embodiments, may be a computer server or a cloud-based infrastructure architecture.

The server 14 may include a memory storing various data. The memory of the server 14 may store URL data such as website address and location information corresponding to a particular entity such as, but not limited to, a business, person, structure, monument or the like, or any other entity, wherein location information is associated with each URL regarding the entity and stored as a geo-identified URL data. In other words, the URLs regarding a particular entity are grouped together based on the geo-identification area of the entity and are accessible to all users of the system 10. In most instances, this is a single URL associated with a location for the entity.

Figure 2A:
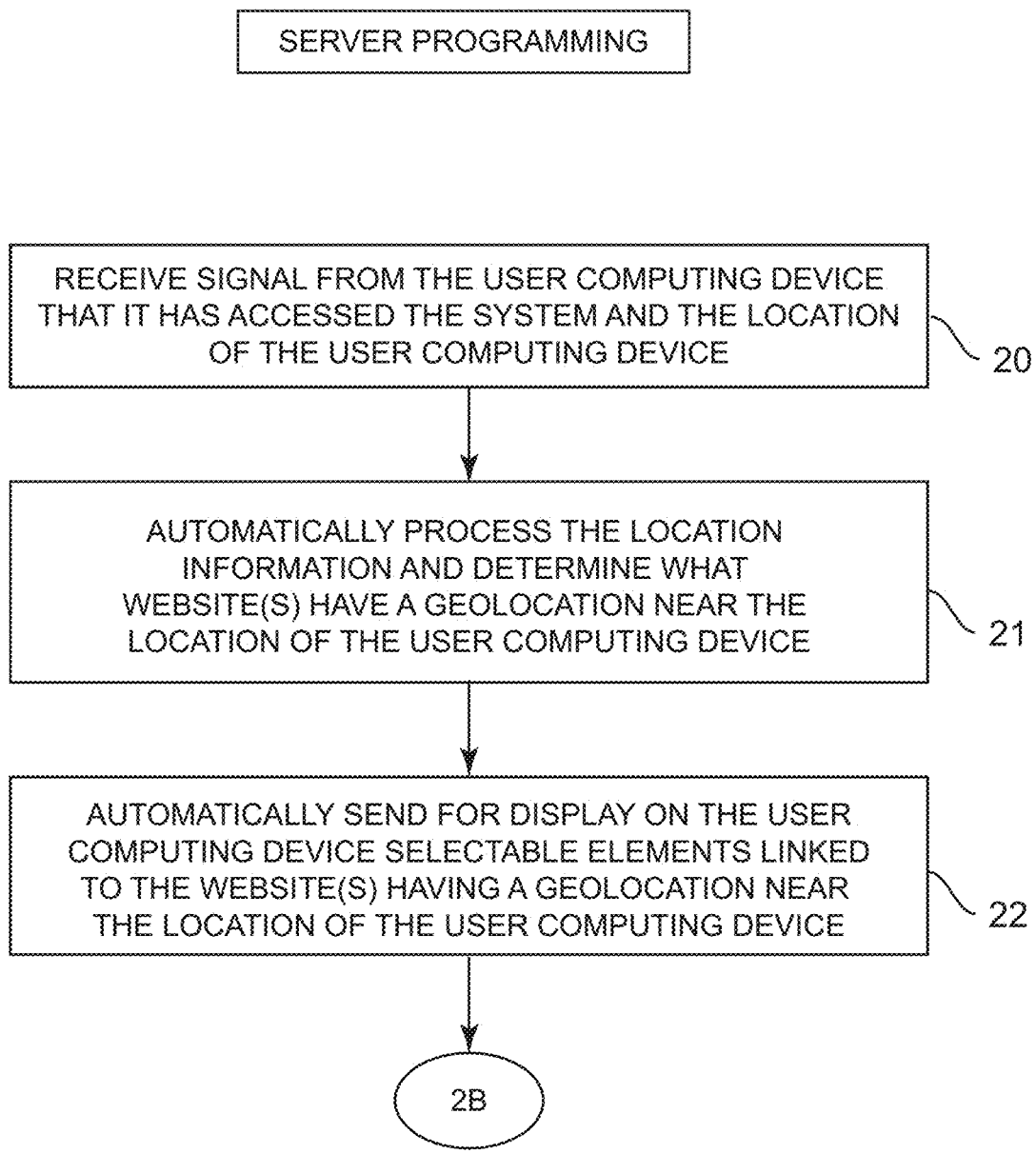
FIG. 2A is a flowchart of programmed instructions executed by a server of a system for obtaining URLs based on geo-identification area according to an embodiment.
Figure 2B:
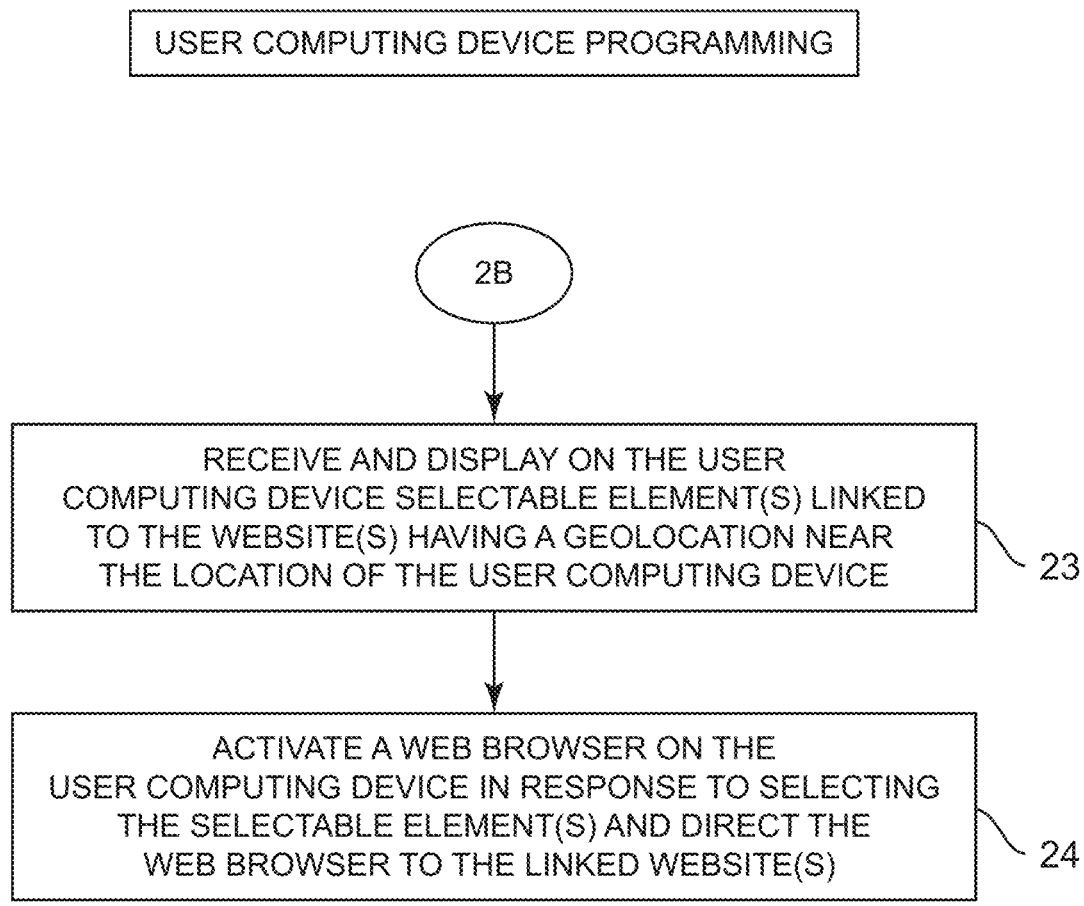
FIG. 2B is a flowchart of programmed instructions executed by a user computing device of a system for obtaining URLs based on geo-identification area according to an embodiment.

The user computing device 12 may be coupled to the server 14, and, referring to FIG. 2A, the server 14 may be programmed to receive a signal from the user computing device that the user computing device has accessed the system, the signal including the location of the user computing device (Step 20); automatically process the location information and determine what website(s) have a geolocation near the location of the user computing device (Step 21); and automatically send for display on the user computing device, selectable elements linked to the website(s) having a geolocation near the location of the user computing device (Step 22). Once the selectable elements are sent for display on the user computing device 12, and referring to FIG. 2B, the user computing device 12 may be programmed to receive and display on the user computing device, selectable element(s) linked to the website(s) having a geolocation near the location of the user computing device (Step 23); and activate a web browser on the user computing device in response to selecting the selectable element(s) and direct the web browser to the linked website(s) (Step 24).

Figure 3A:
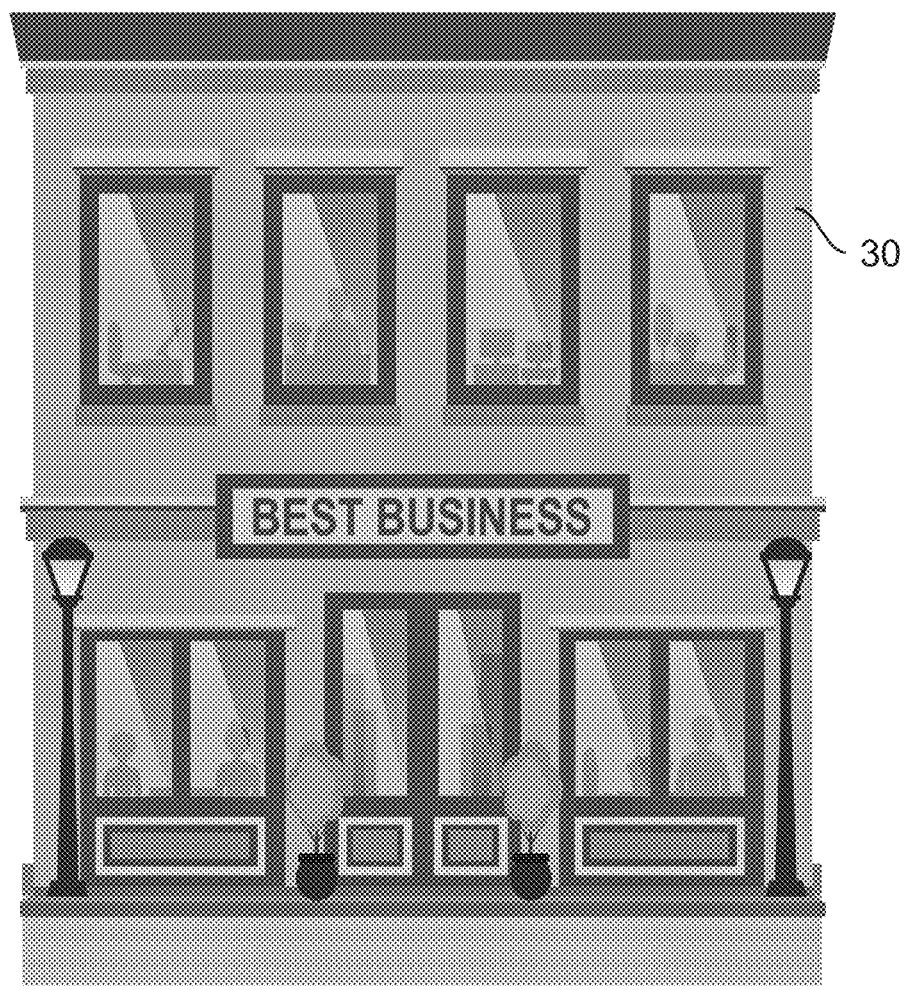
FIG. 3A depicts a user interface of a user computing device operating a system for obtaining URLs based on geo-identification area according to an embodiment.
Figure 3B:
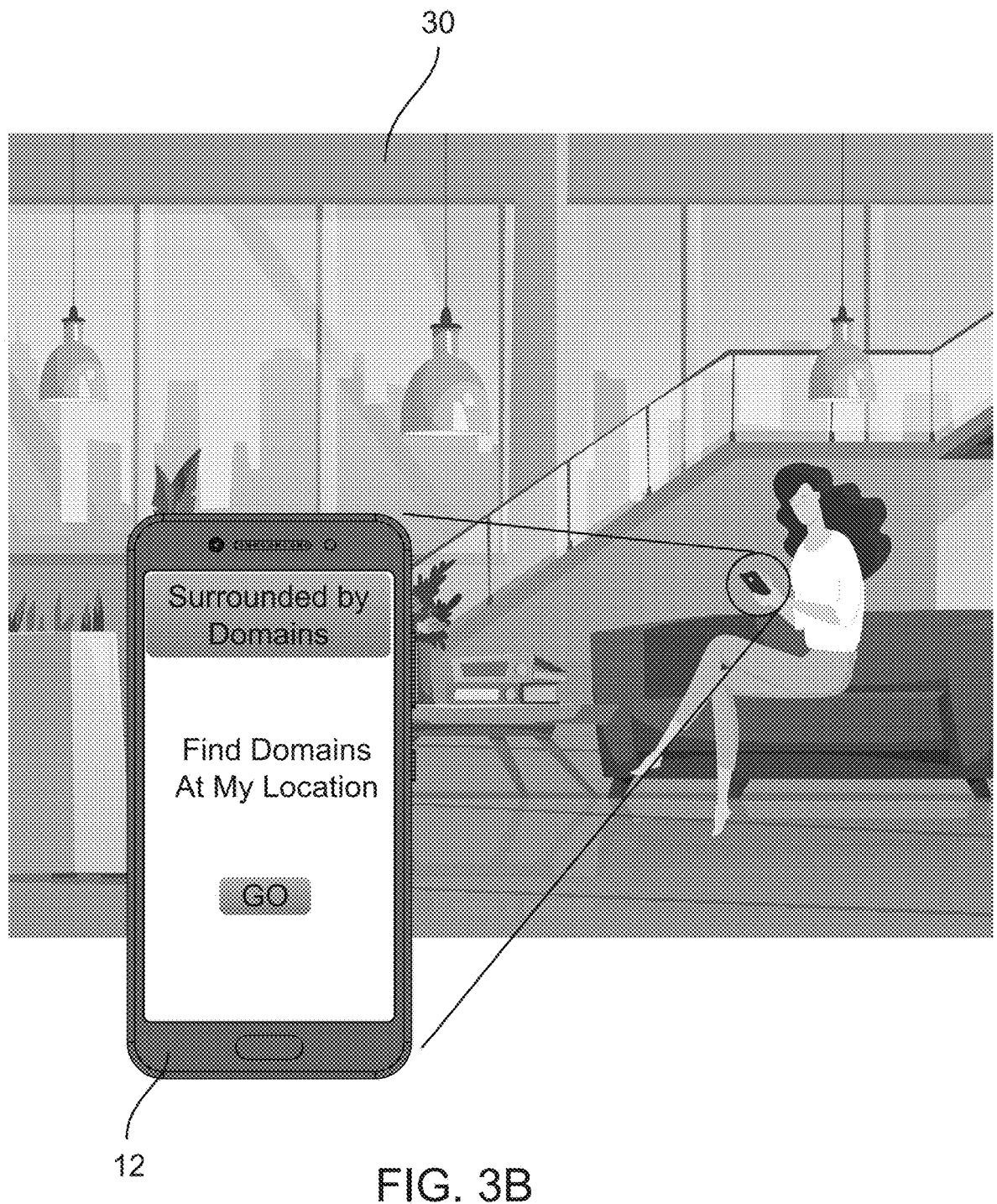
FIG. 3B depicts a user interface of a user computing device operating a system for obtaining URLs based on geo-identification area according to an embodiment.

FIGS. 3A-3D depict operation of the system 10 according to some embodiments. For example, and not as a limitation, a user may be visiting an office 30 as depicted in FIG. 3A. When the user is inside the office 30, as shown in FIG. 3B, the user may access the system 10 utilizing the user computing device 12, such as through an app, a web app, and the like, wherein activation of the app or activating the app and selecting an input element to find URL results in sending a signal to from the user computing device 12 to the server 14, wherein the signal includes the location of the user computing device. In response, the server 14 automatically processes the location information of the user computing device 12 and determines what website has a geolocation near the location of the user computing device, such as the website of the company in the office 30 being visited by the user.

Figure 3C:
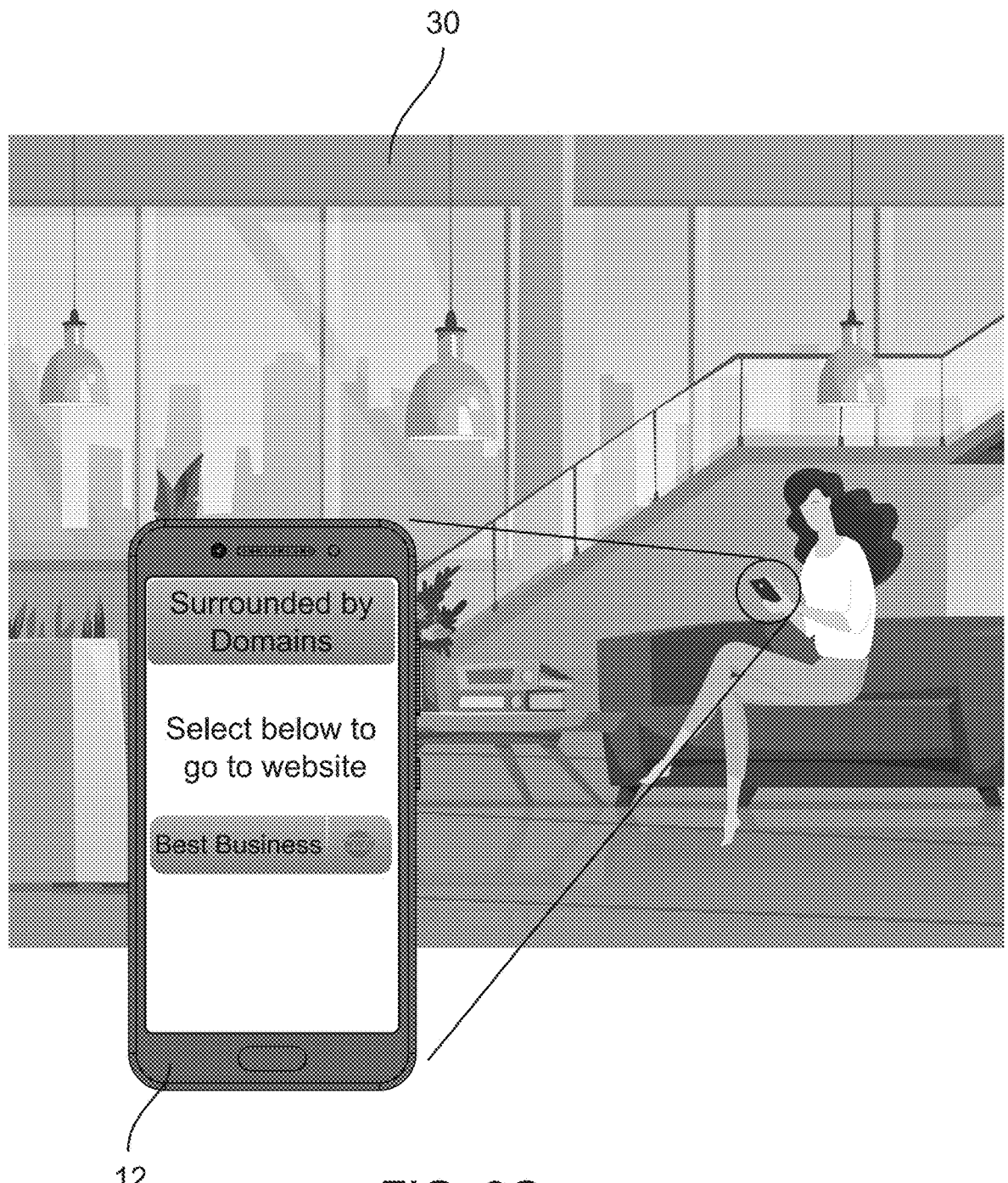
FIG. 3C depicts a user interface of a user computing device operating a system for obtaining URLs based on geo-identification area according to an embodiment.
Figure 3D:
FIG. 3D depicts a user interface of a user computing device operating a system for obtaining URLs based on geo-identification area according to an embodiment.

The server, 14 may then automatically send for display on the user computing device 12, a selectable elements linked to the website having a geolocation near the location of the user computing device 12, and the user computing device 12 is programmed to receive and display the selectable element, as shown in FIG. 3C. The user may then select the selectable element wherein the selectable element may be a hyperlink or other means of activating a web browser of the user computing device 12 and open the website having a geolocation near the location of the user computing device 12, such as the website of the company being visited by the user as shown in FIG. 3D. In some embodiments, the user computing device 12 may be programmed to automatically open a web browser on the user computing device 12 and open the website having a geolocation corresponding to the location of the user computing device 12.

Figure 4A:
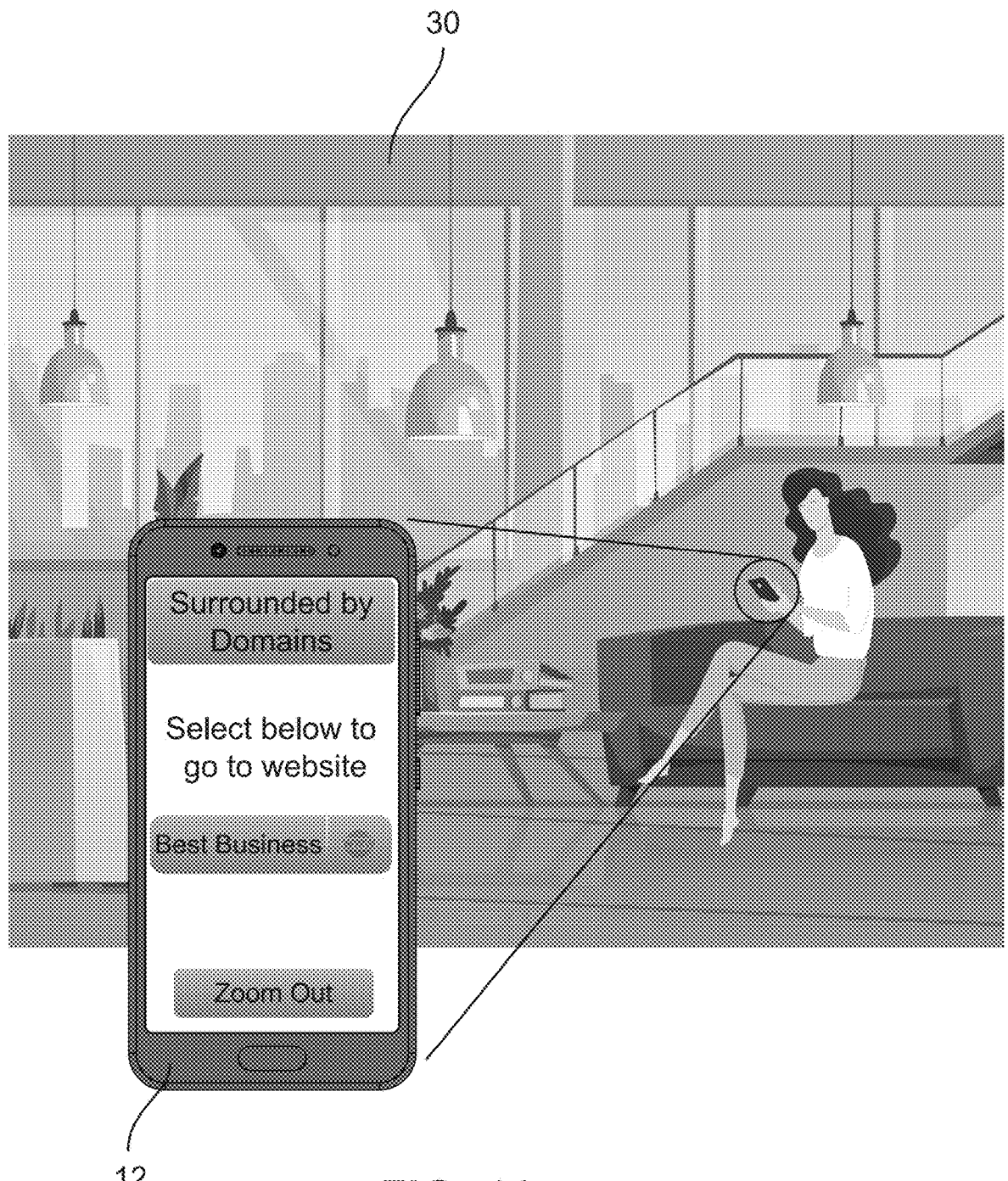
FIG. 4A depicts a user interface of a user computing device operating a system for obtaining URLs based on geo-identification area according to an embodiment.
Figure 4B:
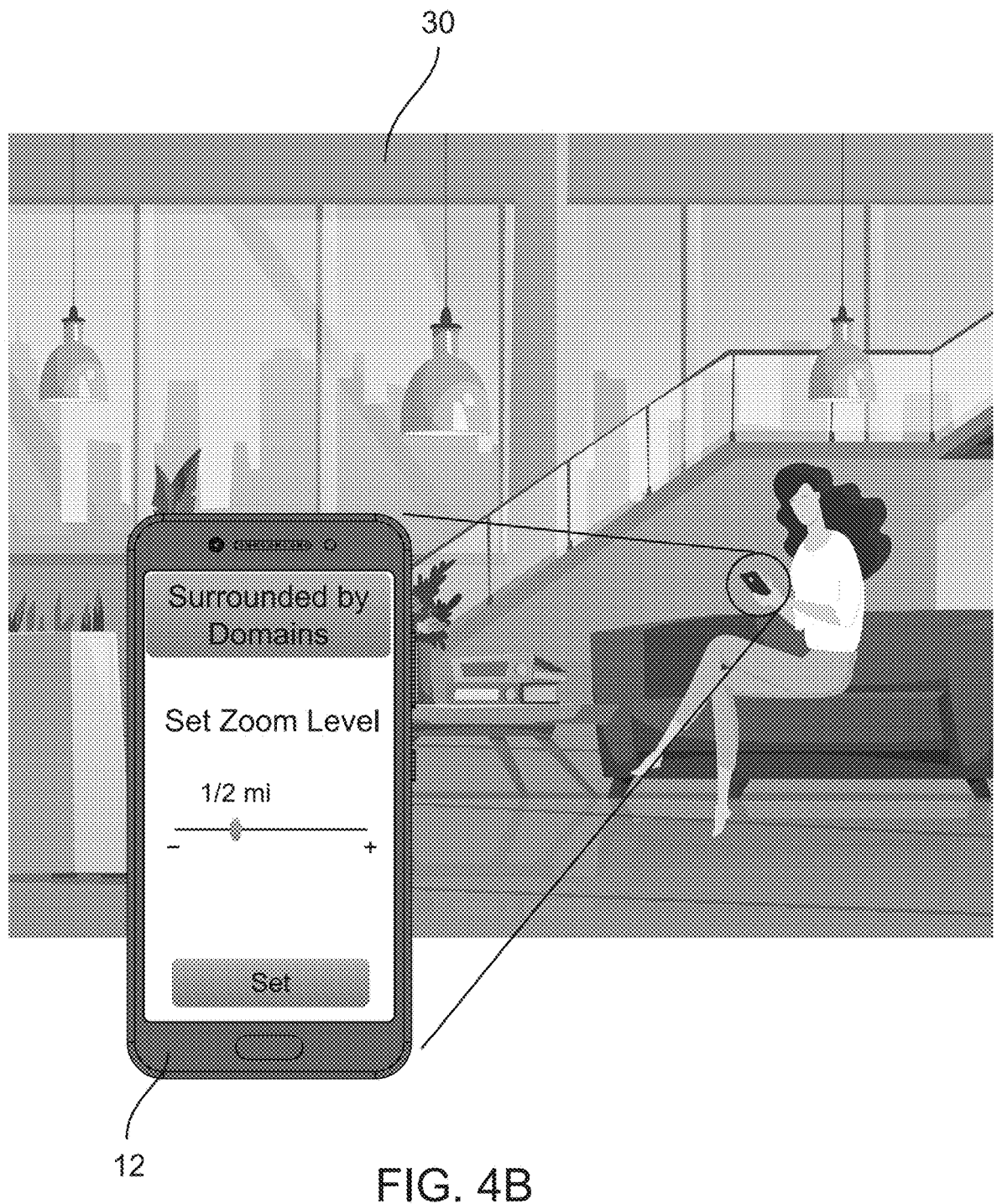
FIG. 4B depicts a user interface of a user computing device operating a system for obtaining URLs based on geo-identification area according to an embodiment.

Embodiments of the system 10 may operate to allow the user computing device 12 to set a zoom radius around the user computing device 12 in order to find other website(s) near the user computing device 12 wherein the geolocation of the website(s) are within the proximity zone or geofence established by the user using the user computing device 12. An example of these embodiments is shown in FIGS. 4A-4E. The server 14 may further be programmed to send for display on the user computing device 12 a selectable element for zooming out as shown in FIG. 4A, wherein the user computing device 12 is at a business or entity 30. The user may select the zoom out selectable element on the user computing device 12 and the server may send for display on the under computing device 12 a user interface for setting the zoom radius. For example, as shown in FIG. 4B the user computing device may display a zoom slider that allows the user to slide the slider bar to set a zoom radius, such as ½ mile as depicted in FIG. 4B. Other means of entering the zoom level may be utilized, such as radio button selectors, text entry boxes and the like. Once the user sets the zoom radius, the user may select a "set" selectable element on the screen of the user computing device 12, where the user computing device 12 sends to the server 14, the user determined zoom radius.

Figure 4C:
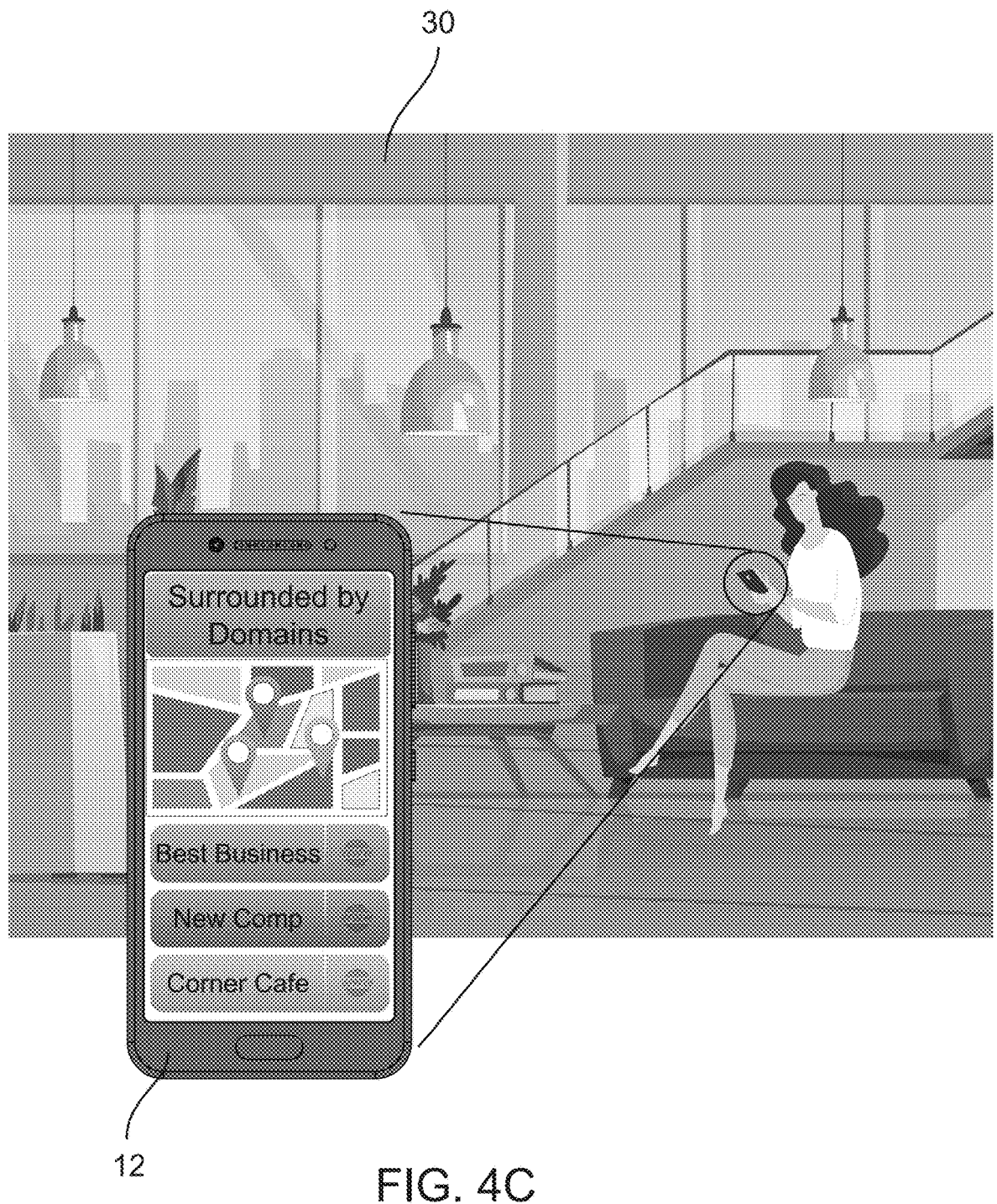
FIG. 4C depicts a user interface of a user computing device operating a system for obtaining URLs based on geo-identification area according to an embodiment.
Figure 4D:
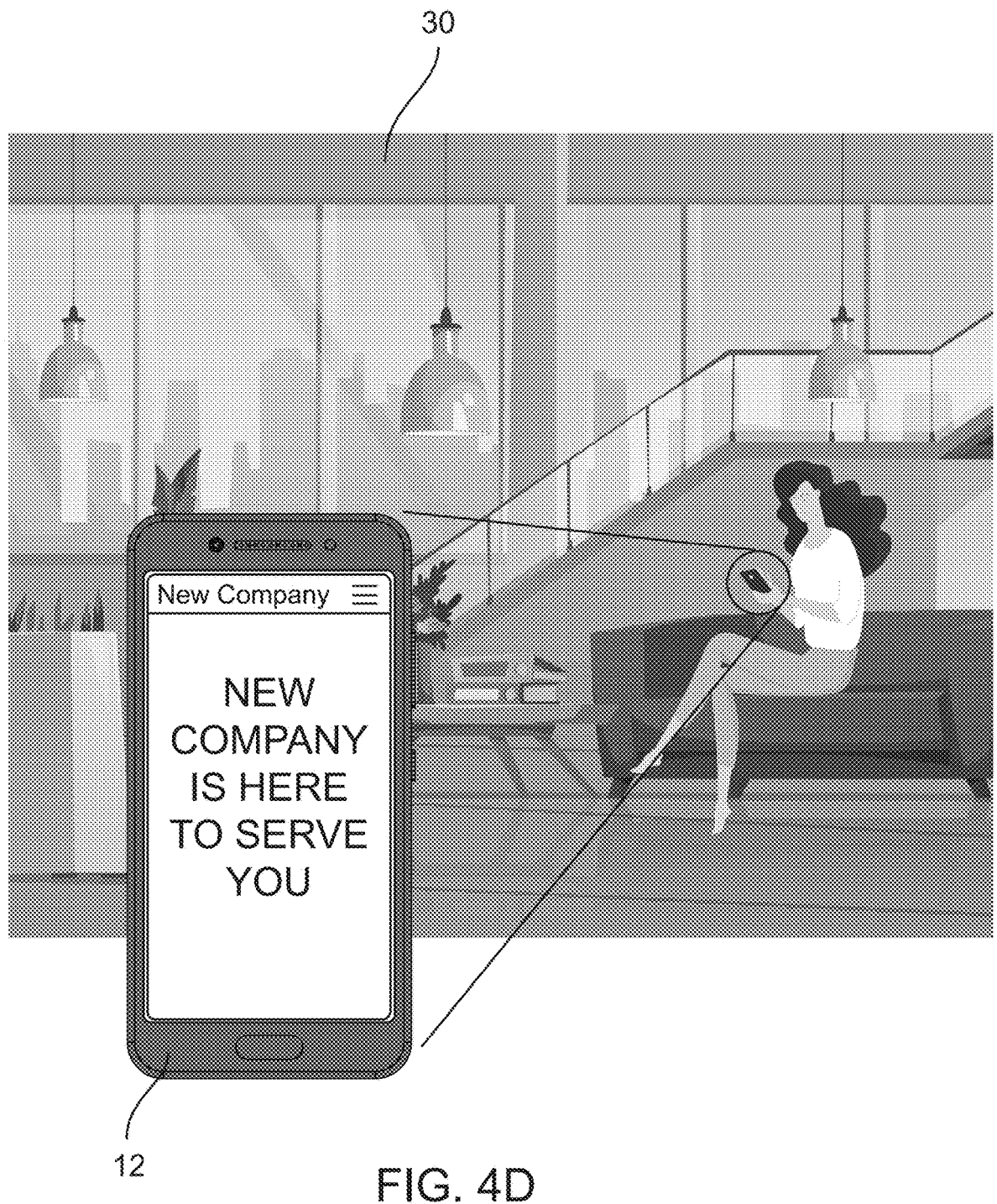
FIG. 4D depicts a user interface of a user computing device operating a system for obtaining URLs based on geo-identification area according to an embodiment.
Figure 4E:
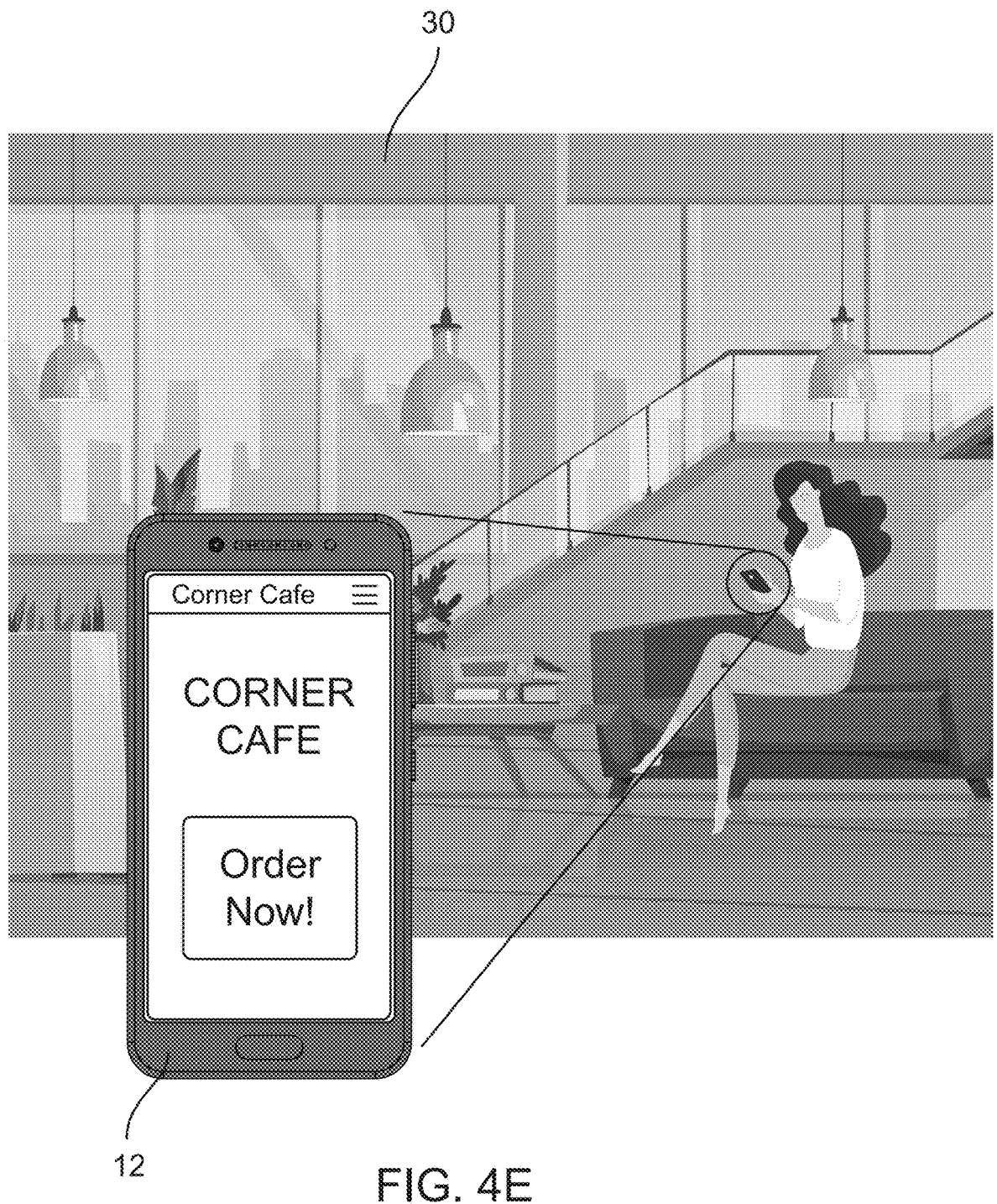
FIG. 4E depicts a user interface of a user computing device operating a system for obtaining URLs based on geo-identification area according to an embodiment.

The server 14, may be programmed to receive and automatically processes the location information of the user computing device 12 and the zoom radius and determines what websites have a geolocation within the zoom radius around the location of the user computing device 12. The server 14 may then automatically send for display on the user computing device 12, selectable elements linked to the websites having a geolocation within the zoom radius around the location of the user computing device 12, and the user computing device 12 is programmed to receive and display the selectable elements, as shown in FIG. 4C. The user may then select any of the selectable elements wherein the selectable element selected may be a hyperlink or other means of activating a web browser of the user computing device 12 and open the website having a geolocation within the zoom radius the location of the user computing device 12, such as the website of the company being visited by the user as shown in FIG. 3D, a website of another nearby business within the zoom radius as shown in FIG. 4D, a website of a restaurant within the zoom radius as shown in FIG. 4E.

In some embodiments, as shown in FIG. 4C, the selectable elements sent for display from the server 14 to the user computing device 12 may include a map depicting a location of the entities associated with each of the selectable elements. They may be color coded, wherein the color of a location pin on the map may correspond to the selectable element of the website. In other embodiments, there may be just a map, wherein the location pins on the map are the selectable elements that open the web browser on the user computing device 12 and direct it to the website associated with the location pin. In other embodiments, there may be just a list of the websites having a geolocation within the zoom radius.

Figure 5:
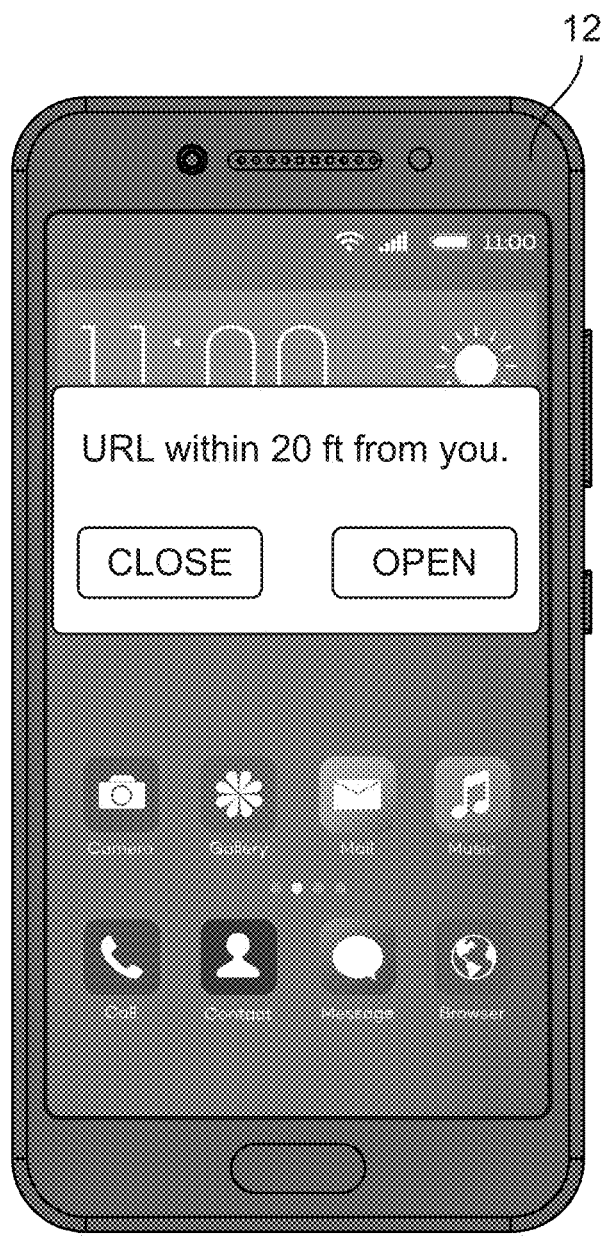
FIG. 5 depicts a user interface of a user computing device operating a system for obtaining URLs based on geo-identification area according to an embodiment.

In some embodiments, the system 10 may operate to alert the user computing device 12 of websites nearby, as shown in FIG. 5. In these embodiments, as the user computing device 12 is moving, such as a user walking, driving, riding or otherwise moving, the user computing device 12 may be programmed to send the location of the user computing device 12 to the server 14, and the server 14 may be programmed to determine websites having a geolocation near the user computing device 12 and send a notification, like a push notification, with the website selectable element as shown in FIG. 5.

The user may set a radius, such as the zoom radius shown in FIG. 4B in order to set how close the user wished to receive alerts. In other embodiments, the alerts or notifications may be sent to the user computing device 12 based on the user's profile. For example, and without limitation, the user profile may have demographic information, likes, hobbies, employment and the like. The server 14 may then be programmed to only send websites that correspond to the user profile information and are nearby the location of the user computing device 12, such as within the zoom radius.

Figure 6:
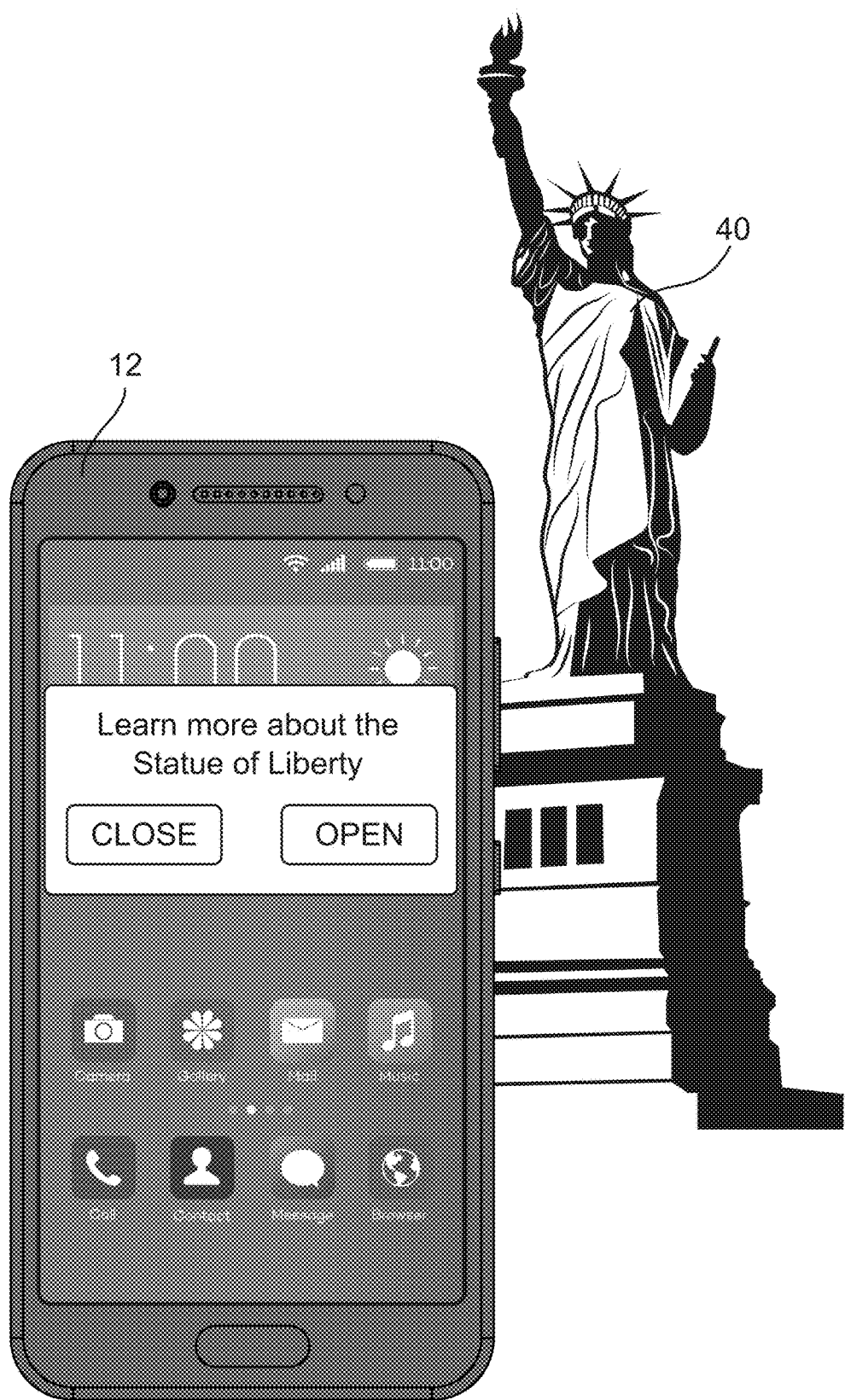
FIG. 6 depicts a user interface of a user computing device operating a system for obtaining URLs based on geo-identification area according to an embodiment.

Other uses may include that shown in FIG. 6, wherein the notification may be sent to the user computing device as the user computing device is near a famous entity, such as a monument, a historic site, a famous building, an art display, a museum, a stadium, a house, or the like where tourists would visit. As the user computing device 12 is within a predetermined distance from the famous entity, a website having a geolocation at the famous entity that is within the predetermined distance or zoom radius of the user computing device 12 may then send the location of the user computing device 12 to the server 14, allowing the server 14 to automatically send the website of the famous entity.

Figure 7:
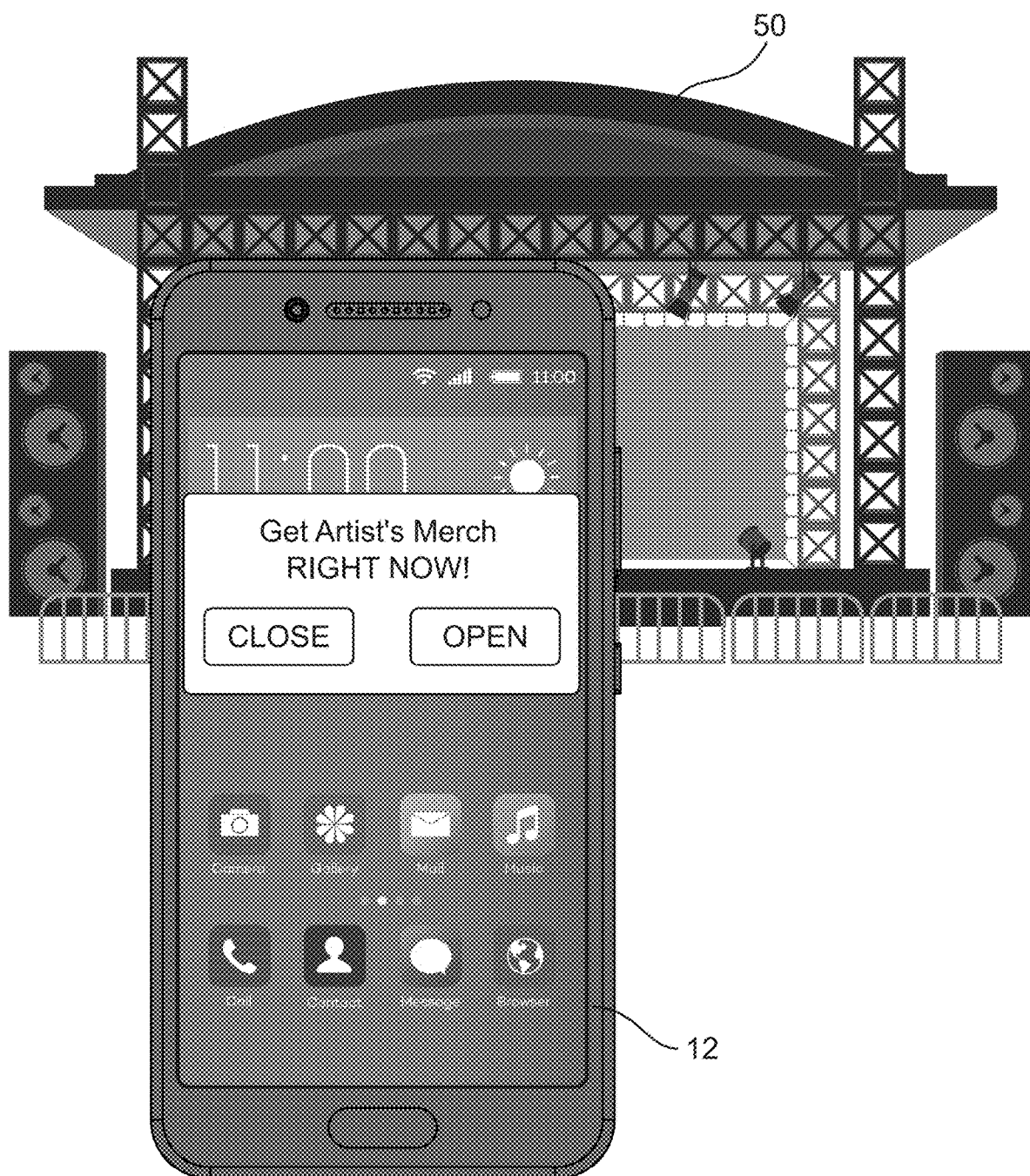
FIG. 7 depicts a user interface of a user computing device operating a system for obtaining URLs based on geo-identification area according to an embodiment.

Additionally, the system 10 may operate at entertainment venues and shows, such as that depicted in FIG. 7. The server 14 may be programmed to send for display on the user computing device 12 a website for purchasing of merchandise at an event, such as a concert, a play, a musical, a sporting event, or any other type of event where merchandise may be sold, wherein the website has a geolocation at the event and the server 14 can determine the user computing device 12 at the same location as the geolocation of the website and send the website for selection to the user computing devices 12 as a selectable element.

Figure 8A:
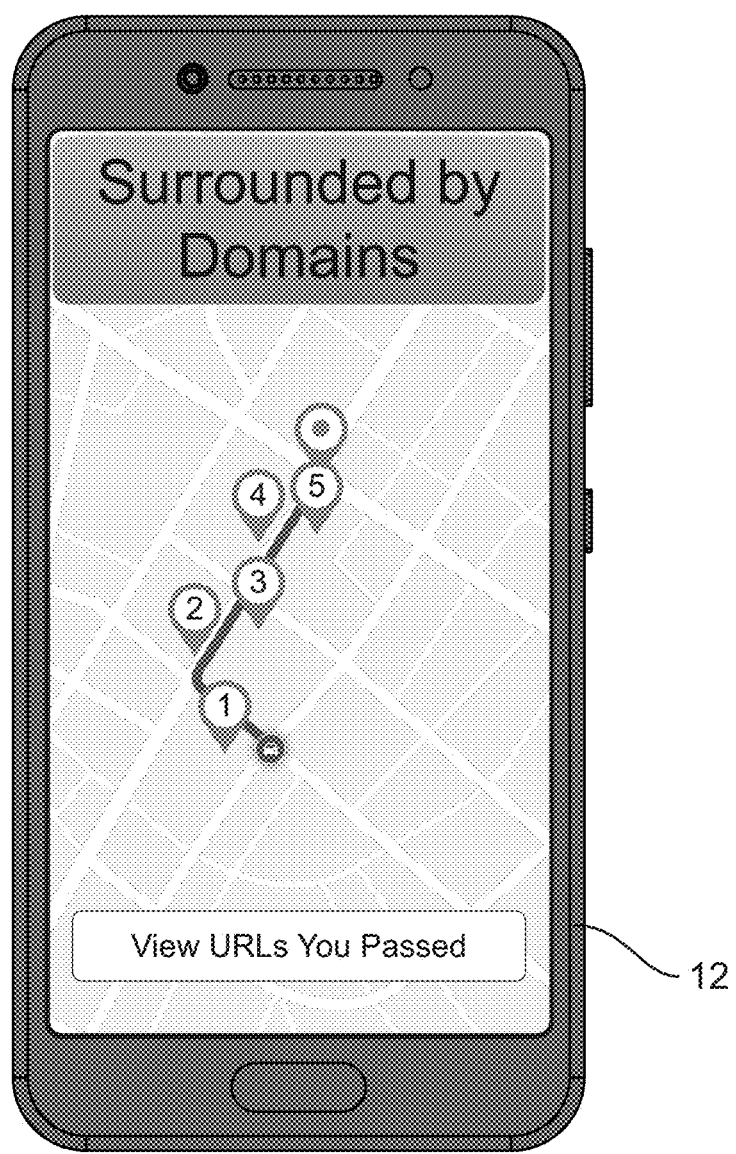
FIG. 8A depicts a user interface of a user computing device operating a system for obtaining URLs based on geo-identification area according to an embodiment.
Figure 8B:
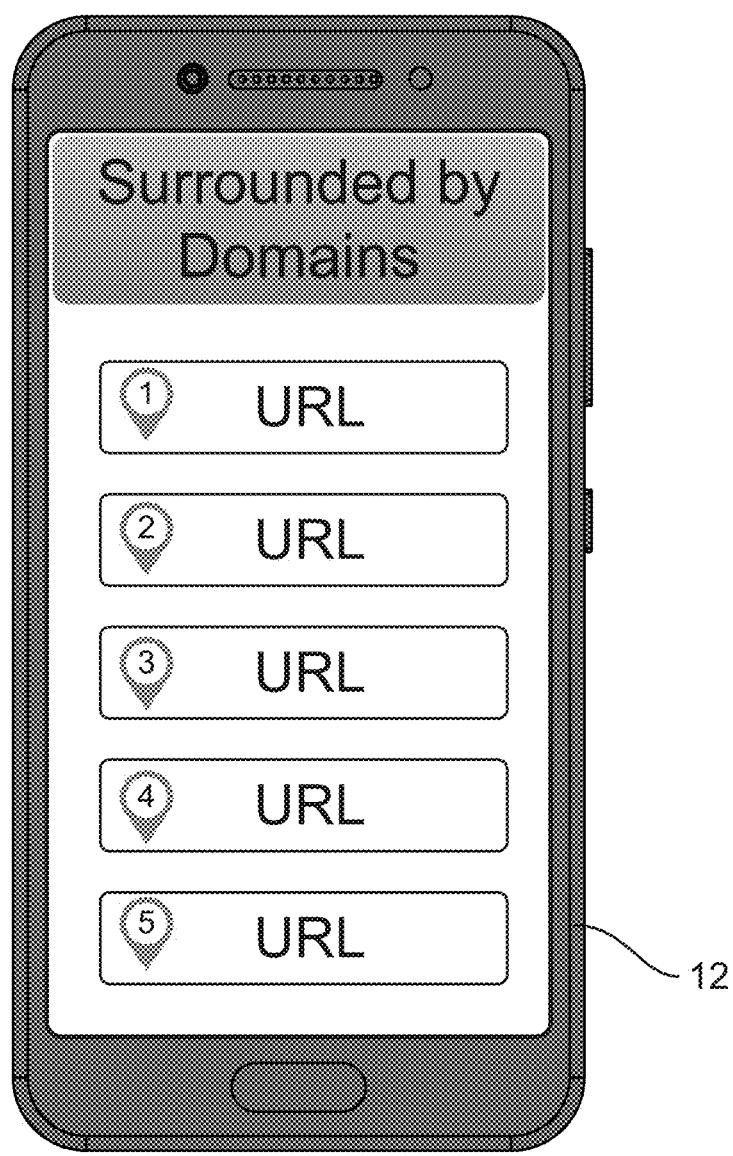
FIG. 8B depicts a user interface of a user computing device operating a system for obtaining URLs based on geo-identification area according to an embodiment.

Another embodiment of the system 10 may include aggregating all of websites or URLs that the user computing device 12 passed during a set amount of time. For example, and without limitation, a user may travel during a day to work or for work. The user computing device 12 of the user may send the location of the user computing device 12 through out the day. As the user computing device passes various geolocation websites that are within a predetermined distance of the user computing device at any one time, the server 14 may be programmed to store in memory all of the geolocated websites the user passes during the set amount of time. As shown in FIGS. 8A-8B, the predetermined time may be as the user is driving home from work. The server 14 may be programmed to send for display, in response to receiving a request from the user computing device 12, a list of all websites that the user computing device 12 passed during the drive home. The server 14, as shown in FIG. 8A, may send a map depicting the route traveled and the location of each of the websites determined by the server to be nearby the user computing device 12 during the set time period as the user computing device 12 was traveling.

Additionally, as shown in FIG. 8A, the server 14 may be programmed to send a selectable element that allows the user to then see additional selectable elements having the links to the websites that the user computing device passed during the set time period, as shown in FIG. 8B. In embodiments, the selectable elements with links may indicate what pin location the website is associated with on the map. The server may be programmed to store all the route information and nearby websites have in a geolocation along the route for later viewing and/or utilization.

Figure 9A:
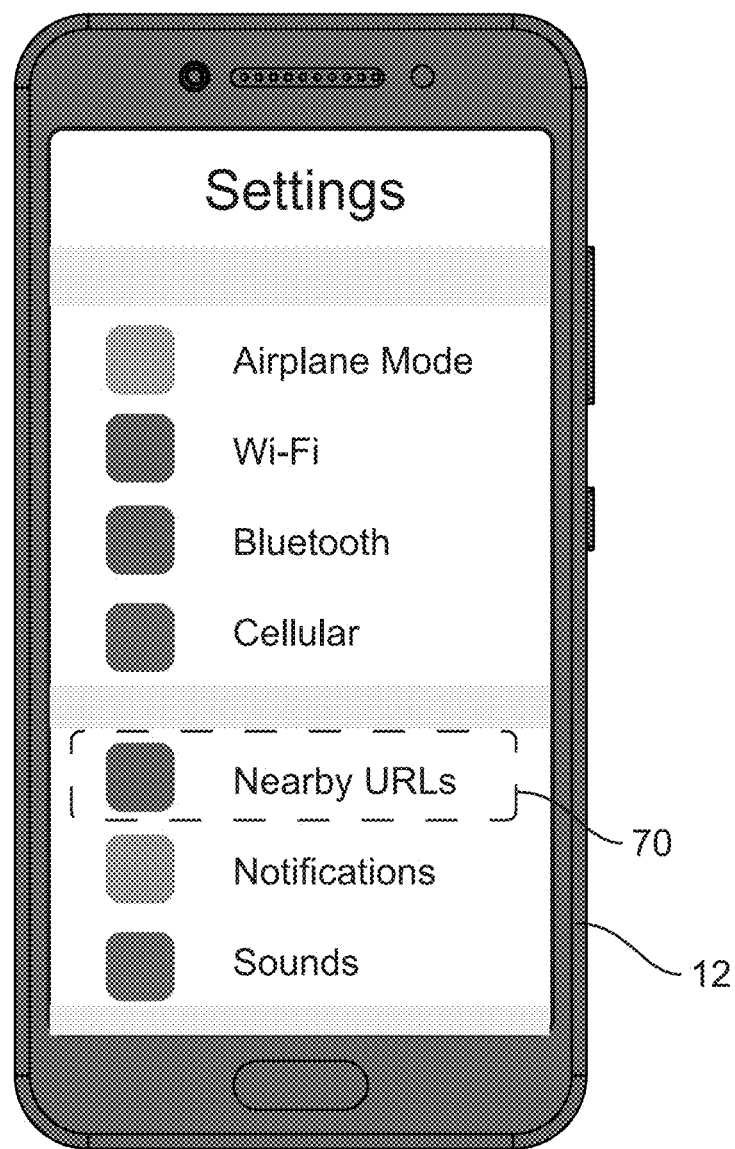
FIG. 9A depicts a user interface of a user computing device operating a system for obtaining URLs based on geo-identification area according to an embodiment.
Figure 9B:
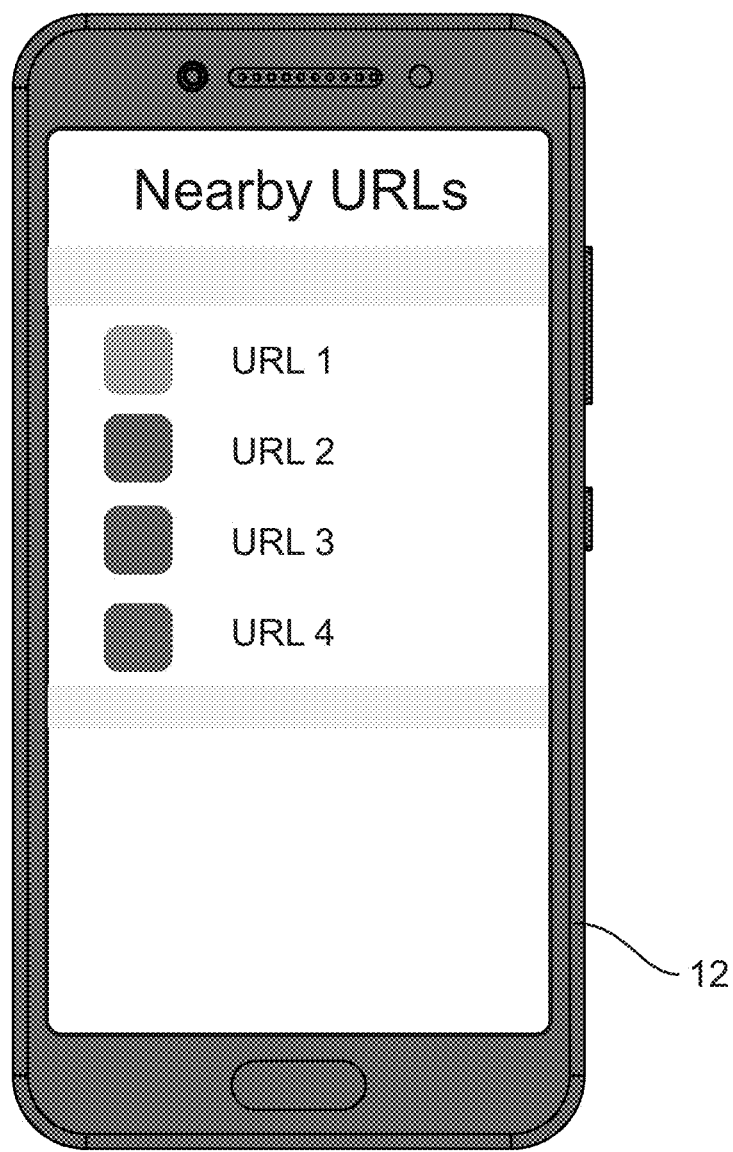
FIG. 9B depicts a user interface of a user computing device operating a system for obtaining URLs based on geo-identification area according to an embodiment.

In another embodiment, as depicted in FIGS. 9A-9B, the system 10 may operate with standard system settings of a smartphone 12. For example and without limitation, the settings of the smartphone 12 may include a Nearby URLs setting 70, as shown in FIG. 9A. Selecting the Nearby URLs setting 70 directs the user to a Nearby URLs interface as shown in FIG. 9B that shows all of the nearby URLs or websites that have a geolocation nearby the location of the smartphone 12. The user may select on of these to open the web browser on the phone and be directed to the website. In these embodiments, the system 10 is built in as a native settings feature of the smartphone 12.

Embodiments may be available on or through the internet, such as through domain names reserved and owned by Applicant that include gpsmyurl.com, mygpsurl.com, urlspot.com, urlbutton.com, floatingurl.com, floating-domain.com, surroundedbydomains.com, domainhereandnow.com, hereherweb.com, url-x.com or the like.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

What is claimed is:

1. A system for obtaining URLs with a geolocation, the system comprising:
　a server having a memory storing geo-identified URL data; and
　at least one user computing device coupled to the server, wherein the server is programmed to:
　　receive a signal from the user computing device that the user computing device has accessed the system, the signal including the location of the user computing device;
　　automatically process the location information and determine what websites have a geolocation near the location of the user computing device;
　　automatically send for display on the user computing device, at least one selectable element linked to at least one website having a geolocation near the location of the user computing device; and
　　automatically store and aggregate in memory all websites having a geolocation near the location of the user computing device at various locations of the user computing device as the user computing device travels for a set period of time; and wherein the user computing device is programmed to:
   receive and display on the user computing device, a map depicting a geolocation the at least one selectable element linked to the at least one website having a geolocation near the location of the user computing device, wherein the at least one selectable element is a marker depicted on the map showing the geolocation of the at least one selectable element;
   receive and display on the user computing device a route traveled by the user computing device and aggregated selectable elements depicted on a map indication a location of each of the aggregated websites near the location of the user computing device during the set time period as the user computing device was traveling; and
   activate a web browser on the user computing device in response to selecting the at least one selectable element or one of the aggregated selectable elements and direct the web browser to the linked at least one website.

2. The system of claim 1, wherein the at least one user computing device is configured to operate a mobile application installed thereon, wherein operation of the mobile application couples the at least one user computing device to the server.

3. The system of claim 2, wherein operation of the mobile application further determines the location of the at least one user computing device and sends location data including the location of the at least one user computing device to the server through the established connection.

4. The system of claim 3, wherein location of the at least one user computing device within a predetermined distance of the geolocation of the at least one website initiates the sending of the at least one selectable element from the server to the at least one user computing device for automatic display on the at least one user computing device.

5. The system of claim 1, wherein the server is further programmed to send for display on the user computing device a selectable element for zooming out.

6. The system of claim 5, wherein the server is further programmed to receive and automatically processes the location information of the user computing device and a zoom radius entered in response to selecting the selectable element for zooming out, and automatically determine websites that have a geolocation within the zoom radius around the location of the user computing device.

7. The system of claim 6, wherein the server is further programmed to automatically send for display on the user computing device, a plurality of selectable elements linked to websites having a geolocation within the zoom radius around the location of the user computing device, and the user computing device is further programmed to receive and display the plurality of selectable elements.

* * * * *